(12) United States Patent
Paran et al.

(10) Patent No.: US 11,228,878 B1
(45) Date of Patent: Jan. 18, 2022

(54) SYSTEM, METHOD, AND COMPUTER PROGRAM FOR EDGE MANAGEMENT OF GEOGRAPHICALLY DISPERSED SENSORS

(71) Applicant: Amdocs Development Limited, Limassol (CY)

(72) Inventors: Eran Yosef Paran, Hod Hasharon (IL); Sarit Chehanowitz, Tel Aviv (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/008,122

(22) Filed: Aug. 31, 2020

(51) Int. Cl.
| | | |
|---|---|---|
| H04L 29/08 | (2006.01) | |
| H04N 7/18 | (2006.01) | |
| H04W 4/38 | (2018.01) | |
| H04W 4/70 | (2018.01) | |

(52) U.S. Cl.
CPC ............ *H04W 4/38* (2018.02); *H04L 67/12* (2013.01); *H04L 67/289* (2013.01); *H04N 7/181* (2013.01); *H04W 4/70* (2018.02)

(58) Field of Classification Search
CPC ......... H04L 67/00; H04L 67/12; H04L 67/18; H04L 67/28; H04L 67/2866; H04L 67/289; H04N 7/00; H04N 7/18; H04N 7/181; H04W 4/30; H04W 4/38; H04W 4/70
See application file for complete search history.

(56) References Cited

U.S. PATENT DOCUMENTS

| | | | | |
|---|---|---|---|---|
| 9,466,109 | B1* | 10/2016 | Adsumilli | .............. H04N 5/247 |
| 9,652,828 | B1* | 5/2017 | Sabripour | ............. G06T 3/4038 |
| 10,795,933 | B1* | 10/2020 | Langley | .................. G06F 16/78 |
| 10,810,847 | B2* | 10/2020 | Stening | ............ G08B 13/19608 |
| 2005/0141607 | A1* | 6/2005 | Kaplinsky | .............. H04N 7/181 375/240.2 |
| 2013/0179540 | A1* | 7/2013 | Isozu | ...................... H04L 67/02 709/218 |
| 2016/0088287 | A1 | 3/2016 | Sadi et al. | |
| 2018/0343602 | A1* | 11/2018 | Baroudi | ................. H04B 7/155 |
| 2019/0116632 | A1* | 4/2019 | Virkkala | ................. H04L 67/12 |
| 2019/0236950 | A1* | 8/2019 | Li | ......................... G05D 1/0285 |
| 2020/0035075 | A1 | 1/2020 | Stening et al. | |
| 2020/0329189 | A1* | 10/2020 | Tanaka | .................... G06T 17/20 |

OTHER PUBLICATIONS

Wikipedia, "Image stitching," Wikipedia, 2020, 9 pages, retrieved from https://en.wikipedia.org/wiki/Image_stitching.
Wikipedia, "Leader election," Wikipedia, 2020, 10 pages, retrieved from https://en.wikipedia.org/wiki/Leader_election.
Partial International Search Report and Written Opinion from PCT Application No. PCT/IB2021/057313, dated Nov. 3, 2021.

\* cited by examiner

*Primary Examiner* — Boris D Grijalva Lobos
(74) *Attorney, Agent, or Firm* — Zilka-Kotab, P.C.

(57) ABSTRACT

As described herein, a system, method, and computer program are provided for edge management of geographically dispersed sensors. An edge device within a network accesses observations of a plurality of geographically dispersed sensors. Additionally, the edge device processes the observations to determine overlapping portions of the observations. Further, the edge device optimizes the observations to form optimized observations for transmission to a cloud processing system, wherein the optimizing is based on the determined overlapping portions of the observations.

18 Claims, 5 Drawing Sheets

US 11,228,878 B1

SYSTEM, METHOD, AND COMPUTER PROGRAM FOR EDGE MANAGEMENT OF GEOGRAPHICALLY DISPERSED SENSORS

FIELD OF THE INVENTION

The present invention relates to techniques for collecting data from geographically dispersed sensors.

BACKGROUND

Sensors are hardware devices that sense real-world properties and report those sensed properties to processing systems that can use the sensed information for various purposes. Sensors can be cameras, radar, lidar, motions detectors, temperature or other environment-related gauges, etc. These sensors can be used for security purposes, for vehicle operation purposes (e.g. for autonomous driving), for augmented reality applications, etc.

As noted above, sensors typically report their sensed information to separate processing systems. These processing systems are usually remote from the sensors (e.g. and have better processing capabilities than the sensors), and thus some network connectivity is usually required between the sensors and the processing systems. With increasing application of sensors in the real-world, not only is network bandwidth consumed by those sensors increasing, but storage capacity required on the receiver end to store all of the sensed information is also increasing.

There is thus a need for addressing these and/or other issues associated with the prior art.

SUMMARY

As described herein, a system, method, and computer program are provided for edge management of geographically dispersed sensors. An edge device within a network accesses observations of a plurality of geographically dispersed sensors. Additionally, the edge device processes the observations to determine overlapping portions of the observations. Further, the edge device optimizes the observations to form optimized observations for transmission to a cloud processing system, wherein the optimizing is based on the determined overlapping portions of the observations.

DETAILED DESCRIPTION

Figure 1:
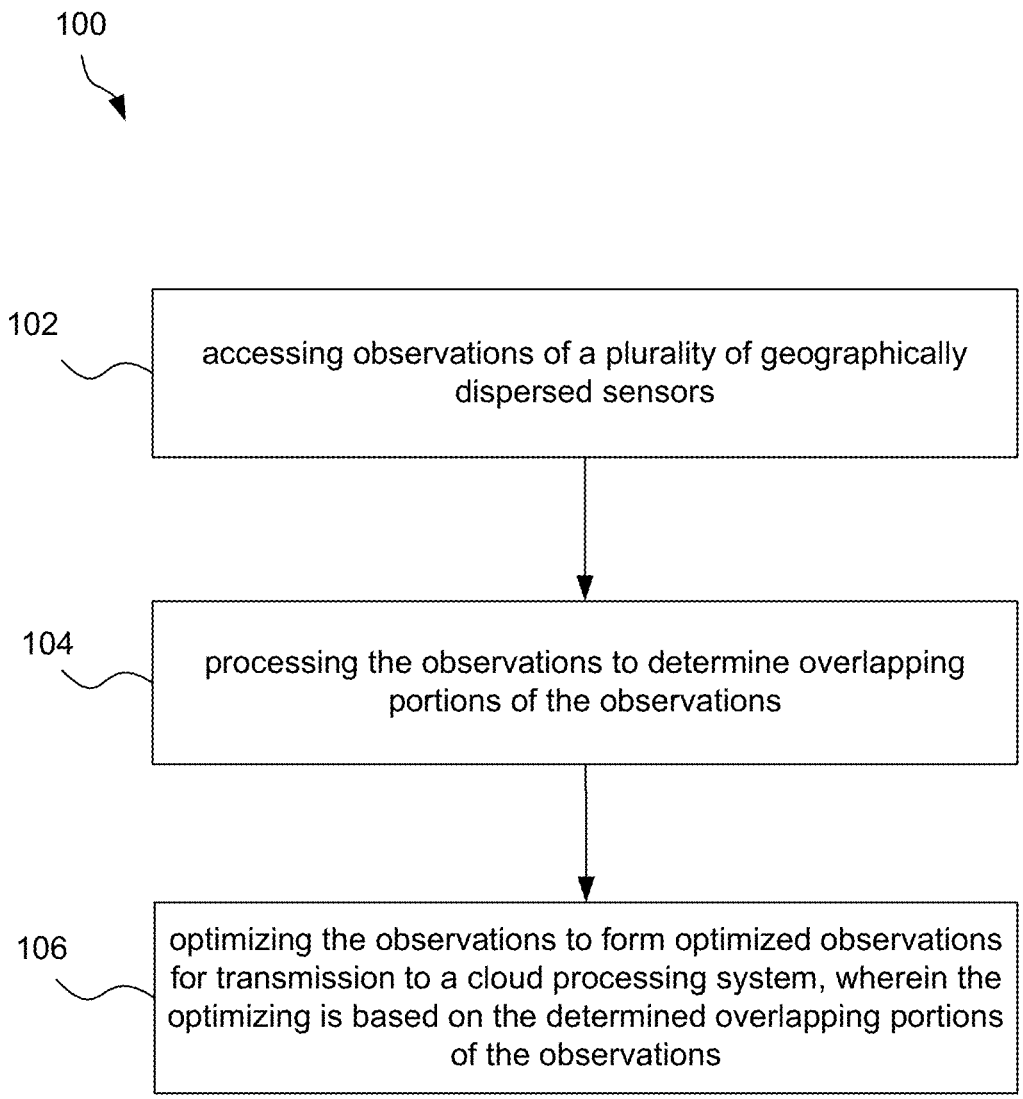
FIG. 1 illustrates a method for edge management of geographically dispersed sensors, in accordance with one embodiment.

FIG. 1 illustrates a method 100 for edge management of geographically dispersed sensors, in accordance with one embodiment. The method 100 may be performed by a stationary or fixed edge device within a network. The edge device may communicate with the geographically dispersed sensors via the network. The edge device and/or the geographically dispersed sensors may also communicate with a cloud processing system via the network or another network. While an edge device is referenced below, it should be noted that any other computer system having a processor may be used for carrying out the method 100.

In one embodiment, the edge device may be independent of a plurality of geographically dispersed sensors and within a defined proximity of the sensors. The edge device is in close proximity to the sensors for local transmission, which is fast and cheap (e.g. low power, such as WiFi or Bluetooth) and saves cost compared to transmitting to the cloud (e.g. via cellular for example). In another embodiment, the edge device may be one of the plurality of geographically dispersed sensors. In this case, the one sensor may be selected (among the plurality of geographically dispersed sensors) as the edge device, based on resource availability (e.g. availability of compute, storage, power, bandwidth, etc. resources) of the sensor compared to resource availability of the remaining sensors.

In yet another embodiment, the edge device may be within a defined geographical area including the sensors, or vice versa. Where the edge device and/or sensors are mobile, which edge device serves which sensors may be determined at defined time intervals. This may ensure that the edge device is within a defined geographical area of the sensors it is serving.

In operation 102, observations of the geographically dispersed sensors are accessed. The sensors may be cameras, video cameras, motions detectors, or other types of sensors capable of making (e.g. measuring, capturing, etc.) observations of a surrounding environment. To this end, the observations may be measurements, images, videos, or any other data observed by the sensors. Just by way of example, the sensors may be cameras and the observations may be images of an environment in which the sensors are placed.

Each of the sensors may be mobile (e.g. located on a drone, vehicle, person as in augmented reality camera, mobile phone, etc.) or stationary (e.g. attached to a wall, lamppost, etc. in a city, in a home, etc.). As noted, the sensors are geographically dispersed, or in other words are located in different geographical locations. To this end, each sensor may make an observation about the area in which it is located.

In one embodiment, the observations may be made by the plurality of geographically dispersed sensors transmitting the observations to the edge device. As an option, a resolution of the observations may be reduced by the sensors for transmission to the edge device. This may in turn reduce bandwidth usage in transmitting the observations. Of course, however, the observations may be accessed (e.g. retrieved, received, etc.) in any desired manner. Still yet, the observations may be accessed at a defined time interval, in one embodiment.

As another option, only observations within a zone (i.e. area) of interest of the edge device may be accessed. For example, the edge device may be assigned a zone of interest. This assignment may be a one-time, static configuration, as an option. The edge device may then notify the sensors of the zone of interest to cause the plurality of geographically dispersed sensors to provide to the edge device only the observations within the zone of interest of the edge device. This may be useful where the sensors make observations for areas both inside and outside the zone of interest of the edge device.

As another option, each of the sensors can apply a machine learning algorithm to determine dynamically if there is a need to provide observations for each and every zone captured by the sensor. For example, if there is no movement in a dead-end street captured by the sensor, then possibly there is no need to upload observations of this dead-end street to the edge device (and similarly to the cloud processing system as described below). However, once there is such movement, the machine learning algorithm can determine the nature of this movement and if it is needed to upload the observations for this zone to the edge device and cloud processing system.

As described above, the edge device and/or the any of the sensors may be mobile, and it may be desired for the edge device to only serve sensors within a defined geographical area, or in other words within a defined vicinity of the edge device. In this case, the edge device may access the observations of only sensors within the defined vicinity of the edge device.

Additionally, in operation 104, the edge device processes the observations to determine overlapping portions of the observations. In the context of the present embodiment, the overlapping portions may be portions of different observations that have a threshold amount of similarity. Thus, overlapping portions may be duplicative of one another.

In one embodiment, the processing may include stitching the observations together to determine the overlapping portions of the observations. Any desired stitching algorithm may be used. In another embodiment, the processing may include accessing a prior determination of which portions of the observations overlap, particularly where the sensors are stationary (whereby the area captured by these stationary sensors' observations is unchanging). In any case, the processing determines, for every observation of every sensor, whether any portion of the observation overlaps with an observation of another sensor.

Further, in operation 106, the edge device optimizes the observations to form optimized observations for transmission to a cloud processing system, wherein the optimizing is based on the determined overlapping portions of the observations. The optimizing may ensure that duplicative observations are prevented from being transmitted to the cloud processing system. For example, the optimizing may include, for each of the overlapping portions, selecting one portion of the overlapping portions to be transmitted to cloud processing system. This optimization may reduce the bandwidth required to transmit the observations to the cloud processing system, and may reduce the storage resources required for the cloud processing system to store the received observations.

In one embodiment, the edge device may transmit the optimized observations to the cloud processing system. In another embodiment, the edge device may cause the sensors to transmit the optimized observations to the cloud processing system. For example, in this embodiment the edge device may instruct each of the sensors on which portion(s) of their observations to transmit to the cloud processing system.

Upon receipt of the optimized observations, the cloud processing system may use such optimized observations for any application. For example, the cloud processing system may use the optimized observations for security applications, tracking applications, augmented reality applications, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
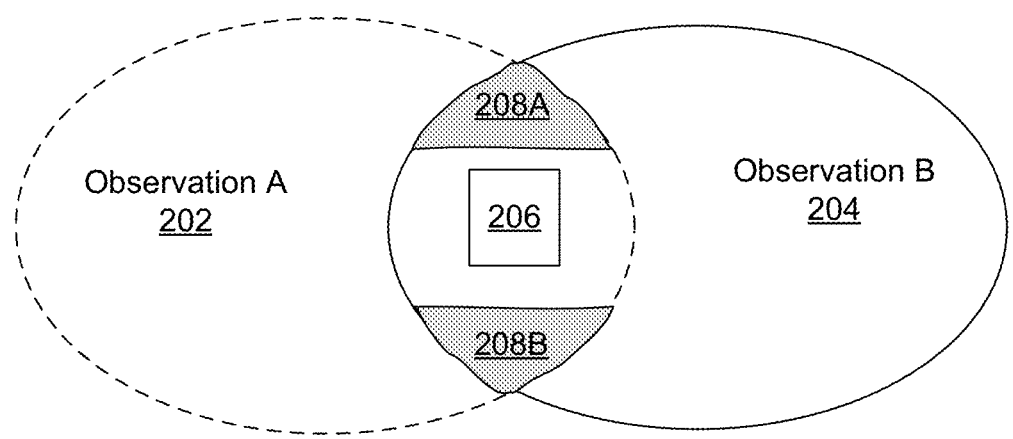
FIG. 2 illustrates overlapping portions of observations of two geographically dispersed sensors, in accordance with one embodiment.

FIG. 2 illustrates overlapping portions of observations of two geographically dispersed sensors, in accordance with one embodiment. The overlapping portions may be determined by an edge device separate from the two geographically dispersed sensors, in one embodiment. In another embodiment, the overlapping portions may be determined by an edge device that is one of the two geographically dispersed sensors. In either case, the overlapping portions may be determined as described above with respect to method 100 of FIG. 1.

As shown, a first observation 202 is captured by a first sensor and a second observation 204 is captured by a second sensor. The first observation 202 and the second observation 204 capture a same object 206 (e.g. a car) from different perspectives. However, the first observation 202 and the second observation 204 also capture overlapping areas, which are shown by overlapping portions 208A-B of observations 202, 204.

Figure 3:
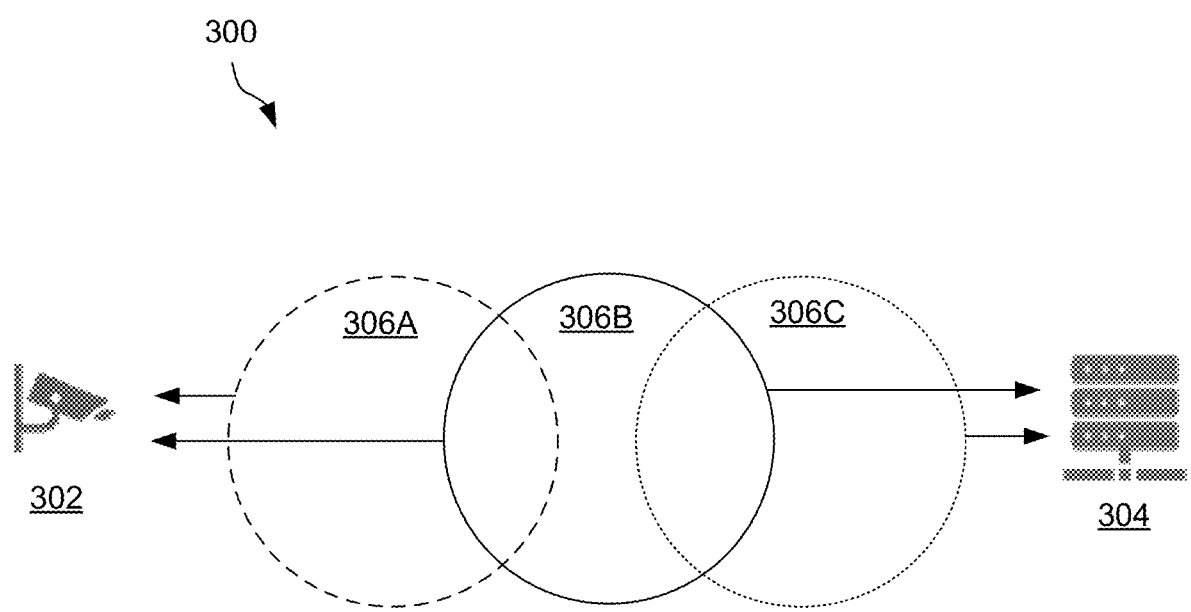
FIG. 3 illustrates a system having distributed edge devices for management of geographically dispersed sensors, accordance with one embodiment.

FIG. 3 illustrates a system 300 having distributed edge devices for management of geographically dispersed sensors, accordance with one embodiment. As an option, the system 300 may be implemented in the context of the details of the method 100 of FIG. 1. Of course, however, the system 300 may be implemented in the context of any desired environment. Further, the aforementioned definitions may equally apply to the description below.

As shown, observations 306A-C captured by geographically dispersed sensors are provided to distributed edge devices 302, 304. Edge device 302 is a stationary camera, and is thus itself a sensor (e.g. selected for having better compute, storage, power, bandwidth, etc. capabilities). Edge device 304 is a stationary edge node that is independent of the sensors.

As shown, one or more of the geographically dispersed sensors may report to multiple edge devices since different edge devices may cover (e.g. be assigned) different shared areas under observation. For example, the sensor capturing observation 306B provides observation 306B to both edge devices 302, 304, whereas the sensor capturing observation 306A provides observation 306A to edge device 302 and the sensor capturing observation 306C provides observation 306C to edge device 304.

When a stationary sensor is reporting to a stationary edge device, it is possible that the edge device is "interested" only in partial image of the sensor (i.e. the part the edge device is "in charge" of for optimization). The intersection of stationary sensors (i.e. their overlapping observations) may be determined one time, and re-used for subsequent observations. This is because the area captured by each stationary sensor is unchanging.

In another embodiment where edge device is stationary (and likely to have high bandwidth as placed there with, for example, a fiber optic network), some of the sensors may be mobile (e.g. cameras mounted on vehicles). In this case, the stationary edge device has an area it is "in charge" of. Due to the mobile nature of the sensors, the intersection cannot be calculated in advance. Mobile sensors which are near the stationary edge device are informed of its presence and are asked to transmit their observations to this edge device. The edge device calculates the overlapping portions and optimizes the observations for transmission to a cloud processing system.

In yet another embodiment, the sensors and the edge device may be mobile. This can happen for example when there are many computing capable connected cars. In this case, cameras mounted on cars observe the world and upload their image/video. The mobile sensors can decide among themselves, for example using some form of a distributed leader choosing algorithm, which sensor is the edge leader among those willing to be the device performing the observation optimization. This decision can be made every few seconds, with every location (defined by a boundary) choosing its own leader. After the leader is chosen, for the specified time the leader operates as the edge device deciding how to optimize the observations of the sensors in its proximity.

Figure 4:
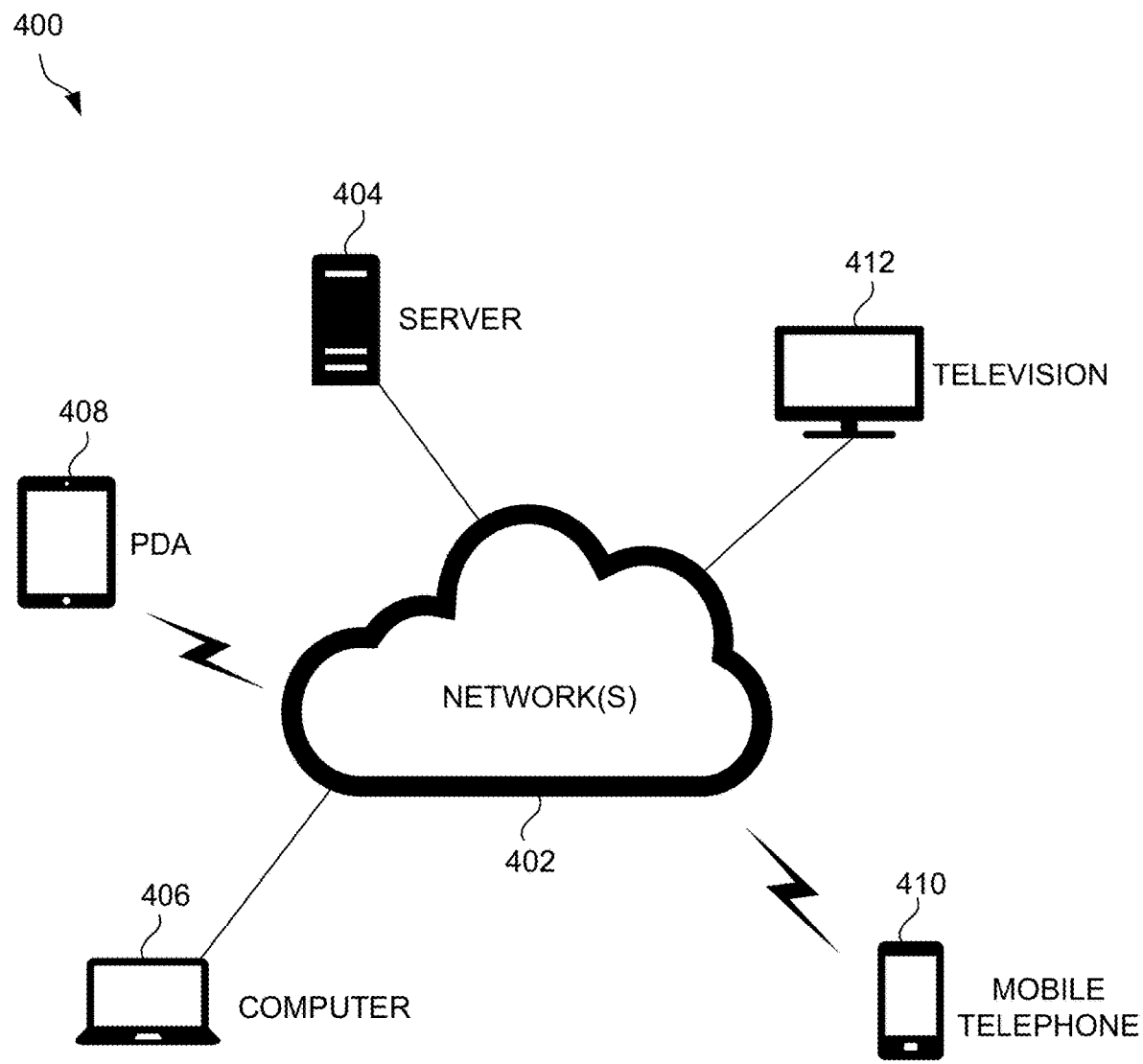
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
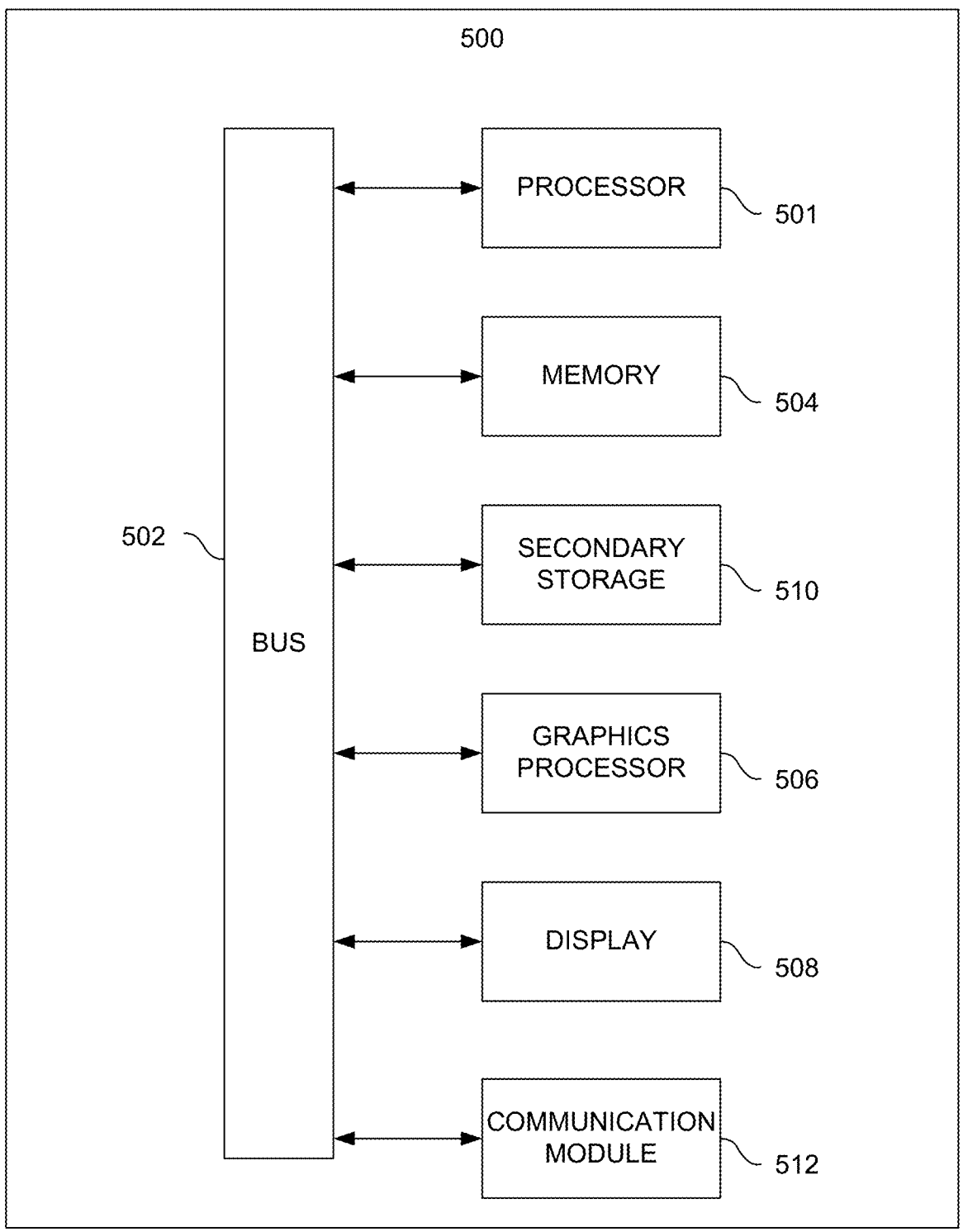
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    accessing, by an edge device within a network, observations of a plurality of geographically dispersed sensors;
    processing the observations to determine, by the edge device, overlapping portions of the observations;
    determining, by the edge device, an optimization for the observations to form optimized observations to be transmitted to a cloud processing system, including:
        for the overlapping portions of the observations, selecting for transmission to the cloud processing system, only one of the portions of the observations that overlap;
    causing, by the edge device, the plurality of geographically dispersed sensors to transmit the optimized observations to the cloud processing system such that duplicative observations are prevented from being transmitted to the cloud processing system.

2. The non-transitory computer readable medium of claim 1, wherein the edge device is independent of the plurality of geographically dispersed sensors and is within a defined proximity of the plurality of geographically dispersed sensors.

3. The non-transitory computer readable medium of claim 2, wherein the observations are accessed by the plurality of geographically dispersed sensors transmitting the observations to the edge device.

4. The non-transitory computer readable medium of claim 3, wherein a resolution of the observations are reduced for transmission to the edge device.

5. The non-transitory computer readable medium of claim 1, wherein the edge device is one sensor of the plurality of geographically dispersed sensors.

6. The non-transitory computer readable medium of claim 5, wherein the one sensor of the plurality of geographically dispersed sensors is selected as the edge device, based on resource availability of the one sensor compared to resource availability of remaining sensors of the plurality of geographically dispersed sensors.

7. The non-transitory computer readable medium of claim 6, wherein the resource availability includes availability of one or more compute resources.

8. The non-transitory computer readable medium of claim 6, wherein the plurality of geographically dispersed sensors are mobile, and wherein the selection is made at defined time intervals.

9. The non-transitory computer readable medium of claim 1, wherein the edge device is assigned a zone of interest.

10. The non-transitory computer readable medium of claim 9, further comprising:
    notifying, by the edge device, the plurality of geographically dispersed sensors of the zone of interest to cause the plurality of geographically dispersed sensors to provide to the edge device the observations within the zone of interest of the edge device.

11. The non-transitory computer readable medium of claim 1, wherein one or more sensors of the plurality of geographically dispersed sensors are mobile.

12. The non-transitory computer readable medium of claim 11, wherein the edge device accesses the observations of the one or more sensors of the plurality of geographically dispersed sensors when the one or more sensors are within a defined vicinity of the edge device.

13. The non-transitory computer readable medium of claim 1, wherein the plurality of geographically dispersed sensors are cameras, and wherein the observations of the plurality of geographically dispersed sensors are images of an environment in which the geographically dispersed sensors are placed.

14. The non-transitory computer readable medium of claim 1, wherein the overlapping portions include portions of different observations that have a threshold amount of similarity.

15. The non-transitory computer readable medium of claim 1, wherein the plurality of geographically dispersed sensors are stationary such that the overlapping portions determined for the observations are reused to form additional optimized observations for subsequent observations of the plurality of geographically dispersed sensors.

16. A method, comprising:

accessing, by an edge device within a network, observations of a plurality of geographically dispersed sensors;

processing the observations to determine, by the edge device, overlapping portions of the observations;

determining, by the edge device, an optimization for the observations to form optimized observations to be transmitted to a cloud processing system, including:

for the overlapping portions of the observations, selecting for transmission to the cloud processing system, only one of the portions of the observations that overlap;

causing, by the edge device, the plurality of geographically dispersed sensors to transmit the optimized observations to the cloud processing system such that duplicative observations are prevented from being transmitted to the cloud processing system.

17. A system, comprising:

an edge device within a network, the edge device having a processor for:

accessing observations of a plurality of geographically dispersed sensors;

processing the observations to determine overlapping portions of the observations;

determining an optimization for the observations to form optimized observations to be transmitted to a cloud processing system, including:

for the overlapping portions of the observations, selecting for transmission to the cloud processing system, only one of the portions of the observations that overlap;

causing, by the edge device, the plurality of geographically dispersed sensors to transmit the optimized observations to the cloud processing system such that duplicative observations are prevented from being transmitted to the cloud processing system.

18. The system of claim 17, wherein the edge device is in communication with the plurality of geographically dispersed sensors via the network.

* * * * *